(12) United States Patent
Koh et al.

(10) Patent No.: US 12,522,626 B2
(45) Date of Patent: *Jan. 13, 2026

(54) THERMALLY STABLE RUTHENIUM PRECURSOR COMPOSITION, AND METHOD FOR FORMING RUTHENIUM-CONTAINING FILM

(71) Applicant: UP CHEMICAL CO., LTD., Pyeongtaek-si (KR)

(72) Inventors: Wonyong Koh, Daejeon (KR); Jin Sik Kim, Pyeongtaek-si (KR); Dae-Young Kim, Pyeongtaek-si (KR)

(73) Assignee: UP CHEMICAL CO., LTD., Pyeongtaek-si (KR)

( * ) Notice: Subject to any disclaimer, the term of this patent is extended or adjusted under 35 U.S.C. 154(b) by 10 days.

This patent is subject to a terminal disclaimer.

(21) Appl. No.: 18/133,003

(22) Filed: Apr. 11, 2023

(65) Prior Publication Data

US 2023/0242560 A1 Aug. 3, 2023

Related U.S. Application Data

(63) Continuation of application No. PCT/KR2021/013991, filed on Oct. 12, 2021.

(30) Foreign Application Priority Data

Oct. 12, 2020 (KR) .......... 10-2020-0131063

(51) Int. Cl.
| | | |
|---|---|---|
| C07F 15/00 | (2006.01) | |
| C07F 17/02 | (2006.01) | |
| C23C 16/18 | (2006.01) | |
| C23C 16/455 | (2006.01) | |

(52) U.S. Cl.
CPC .......... *C07F 15/0053* (2013.01); *C07F 15/00* (2013.01); *C07F 15/0046* (2013.01); *C07F 17/02* (2013.01); *C23C 16/18* (2013.01); *C23C 16/45538* (2013.01)

(58) Field of Classification Search
CPC ............. C07F 15/0053; C07F 15/0046; C23C 16/45553
See application file for complete search history.

(56) References Cited

U.S. PATENT DOCUMENTS

| | | | | |
|---|---|---|---|---|
| 9,957,614 | B2 * | 5/2018 | Han | .......... C09D 1/00 |
| 2017/0226638 | A1 * | 8/2017 | Han | .......... C23C 16/18 |
| 2020/0339617 | A1 | 10/2020 | Kim et al. | |

FOREIGN PATENT DOCUMENTS

| | | |
|---|---|---|
| CN | 106459113 A | 2/2017 |
| JP | 2017-524729 A | 8/2017 |
| KR | 2009-0082543 A | 7/2009 |
| KR | 1020100060482 A | 6/2010 |
| KR | 1020130043557 A | 4/2013 |
| KR | 1020150137962 A | 12/2015 |
| KR | 1020190049587 A | 5/2019 |
| TW | 202011547 A | 3/2020 |
| WO | 2019/195590 A1 | 10/2019 |
| WO | 2019222232 A1 | 11/2019 |

OTHER PUBLICATIONS

CAS Abstract RN 2439216-73-4 (Year: 2020).*
International Search Report from International Application No. PCT/KR2021/013991 mailed Jan. 24, 2022, 2 pages.
Liang Gong Wen et al., Ruthenium Metallization for Advanced Interconnects, 2016 IEEE International Interconnect Technology Conference / Advanced Metallization Conference (IITC/AMC), 3 pages.
Chemical Abstract compounds, STNext RN 2439216-73-4 (Entered STN: Jul. 2, 2020), RN 2439216-72-3 (Entered STN: Jul. 2, 2020), 2 pages.

* cited by examiner

*Primary Examiner* — Amy C Bonaparte
*Assistant Examiner* — Frank S. Hou
(74) *Attorney, Agent, or Firm* — Shih IP Law Group, PLLC.

(57) ABSTRACT

The present application relates to: a ruthenium precursor compound for forming a film having high thermal stability; a precursor composition for forming a film, comprising the ruthenium precursor compound; and a method for forming a ruthenium-containing film using the precursor for forming a film.

9 Claims, 2 Drawing Sheets

THERMALLY STABLE RUTHENIUM PRECURSOR COMPOSITION, AND METHOD FOR FORMING RUTHENIUM-CONTAINING FILM

CROSS-REFERENCE TO RELATED APPLICATIONS

This application is a continuation of PCT Application No. PCT/KR2021/013991, filed on Oct. 12, 2021, which claims priority to Korean Patent Application Number 10-2020-0131063, filed on Oct. 12, 2020, both of which are hereby incorporated by reference in their entirety.

TECHNICAL FIELD

The present disclosure relates to a ruthenium precursor compound for forming a film with high thermal stability, a precursor composition for forming a film including the ruthenium precursor compound and a method of forming a ruthenium-containing film using the precursor composition for forming a film.

BACKGROUND

Ruthenium (Ru) metal conducts electricity well like copper (Cu), tungsten (W) and cobalt (Co) and thus can be used as a wiring material for semiconductor devices. As the width of metal wiring decreases along with integration of semiconductor devices, the resistance of the metal wiring increases. In case of using ruthenium metal for wiring of semiconductor devices, when the metal wiring has a narrow width such as 40 nm or less, the resistance of the metal wiring is less increased than that of Cu or Co. Therefore, the ruthenium metal is being studied as a next-generation wiring material. In order to fill a narrow groove(trench) required for wiring of next-generation semiconductor devices with ruthenium metal, it is advantageous to form a ruthenium metal film by supplying a gaseous ruthenium compound onto the surface of a substrate, such as by chemical vapor deposition (CVD) or atomic layer deposition (ALD).

Some ruthenium precursor compositions are known that can be used in CVD or ALD for the above-described purpose. However, in order to use the ruthenium metal for manufacturing semiconductor devices, a thermally stable ruthenium precursor composition that is not changed in composition at temperatures for vaporizing the precursor composition is needed.

PRIOR ART DOCUMENT

L G. Wen et al., "Ruthenium metallization for advanced interconnects", 2016 IEEE International Interconnect Technology Conference/Advanced Metallization Conference (IITC/AMC), doi:10.1109/iitc-amc.2016.7507651, 2016.

DISCLOSURE OF THE INVENTION

Problems to be Solved by the Invention

The present disclosure relates to a ruthenium precursor compound for forming a film with high thermal stability, a precursor composition for forming a film including the ruthenium precursor compound and a method of forming a ruthenium-containing film using the precursor composition for forming a film.

However, problems to be solved by the present disclosure are not limited to the above-described problems. Although not described herein, other problems to be solved by the present disclosure can be clearly understood by a person with ordinary skill in the art from the following description.

Means for Solving the Problems

A first aspect of the present disclosure provides a ruthenium precursor compound represented by the following Chemical Formula I:

[Chemical Formula I]

in the above Chemical Formula I, each of $R^1$ to $R^6$ is independently hydrogen; a substituted or unsubstituted linear or branched $C_{1-10}$ alkyl group; or a substituted or unsubstituted $C_{3-10}$ cycloalkyl group, and when the alkyl group or cycloalkyl group Is substituted, it is substituted by a linear or branched $C_{1-3}$ alkyl group.

A second aspect of the present disclosure provides a precursor compound for forming a film, including at least one ruthenium precursor compound(s) according to the first aspect.

A third aspect of the present disclosure provides a method of forming a ruthenium-containing film, including forming a ruthenium-containing film by using a precursor composition for forming a film including a ruthenium precursor compound according to the first aspect.

Effects of the Invention

As for a ruthenium precursor composition having low thermal stability, composition ratio of isomers is changed during vaporization. However, according to embodiments of the present disclosure, in a method of forming a ruthenium-containing film using a ruthenium precursor composition of the present disclosure, the composition of a vaporized precursor composition is not changed during use, which is advantageous to form a ruthenium film having uniform properties. Thus, it can be used for manufacturing semiconductor devices.

According to the embodiments of the present disclosure, a ruthenium-containing film having a thickness of several nm to several μm can be formed uniformly in various temperature ranges on a substrate with a pattern (groove or trench) on the surface, a porous substrate or a plastic substrate.

According to the embodiments of the present disclosure, a ruthenium-containing film using the ruthenium precursor composition of the present disclosure can be applied in various ways depending on the purpose of application.

BEST MODE FOR CARRYING OUT THE INVENTION

Hereinafter, embodiments and examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Through the whole document, the term "alkyl" or "alkyl group" includes a linear or branched alkyl group having 1 to 12 carbon atoms, 1 to 10 carbon atoms, 1 to 8 carbon atoms, or 1 to 5 carbon atoms and all the possible isomers thereof. For example, the alkyl or alkyl group may include a methyl group (Me), an ethyl group (Et), a n-propyl group ($^n$Pr), an iso-propyl group ($^i$Pr), a n-butyl group ($^n$Bu), an iso-butyl group ($^i$Bu), a tert-butyl group ($^t$Bu), a sec-butyl group ($^{sec}$Bu), a n-pentyl group ($^n$Pe), an iso-pentyl group ($^{iso}$Pe), a sec-pentyl group ($^{sec}$Pe), a tert-pentyl group ($^t$Pe), a neo-pentyl group ($^{neo}$Pe), a 3-pentyl group, a n-hexyl group, an iso-hexyl group, a heptyl group, a 4,4-dimethyl pentyl group, an octyl group, a 2,2,4-trimethyl pentyl group, a nonyl group, a decyl group, an undecyl group, a dodecyl group, and isomers thereof, but may not be limited thereto.

Through the whole document, the term "film" means "a film" or "a thin film".

Hereinafter, embodiments of the present disclosure have been described in detail, but the present disclosure may not be limited thereto.

A first aspect of the present disclosure provides a ruthenium precursor compound represented by the following Chemical Formula I:

[Chemical Formula I]

in the above Chemical Formula I, each of $R^1$ to $R^6$ is independently hydrogen; a substituted or unsubstituted linear or branched $C_{1-10}$ alkyl group; or a substituted or unsubstituted $C_{3-10}$ cycloalkyl group, and when the alkyl group or cycloalkyl group is substituted, it is substituted by a linear or branched $C_{1-3}$ alkyl group.

In an embodiment of the present disclosure, at least one of $R^1$, $R^2$, $R^5$ and $R^6$ may be a substituted or unsubstituted linear or branched $C_{1-10}$ alkyl group; or a substituted or unsubstituted $C_{3-10}$ cycloalkyl group. In an embodiment of the present disclosure, the ruthenium compound may exclude the case where $R^1$, $R^2$, $R^5$ and $R^6$ are hydrogen.

In an embodiment of the present disclosure, the linear or branched $C_{1-10}$ alkyl groups may be selected from methyl group, ethyl group, n-propyl group, iso-propyl group, n-butyl group, iso-butyl group, sec-butyl group, tert-butyl group, n-pentyl group, iso-pentyl group, sec-pentyl group, tert-pentyl group, neo-pentyl group, 3-pentyl group, n-hexyl group, iso-hexyl group, sec-hexyl group, tert-hexyl group, neo-hexyl group, n-heptyl group, iso-heptyl group, sec-heptyl group, tert-heptyl group, neo-heptyl group, n-octyl group, iso-octyl group, sec-octyl group, tert-octyl group, neo-octyl group, n-nonyl group, iso-nonyl group, sec-nonyl group, tert-nonyl group, neo-nonyl group, n-decyl group, iso-decyl group, sec-decyl group, tert-decyl group, neo-decyl group, and group consisting of isomers thereof, but may not be limited thereto. In an embodiment of the present disclosure the linear or branched $C_{1-10}$ alkyl group may be methyl group, ethyl group, n-propyl group, or iso-propyl group.

In an embodiment of the present disclosure, the $C_{3-10}$ cycloalkyl group may be selected from cyclopropyl group, cyclobutyl group, cyclopentyl group, cyclohexyl group, cycloheptyl group, cyclooctyl group, cyclononyl group, cyclodecyl group, and group consisting of isomers thereof, but may not be limited thereto. In an embodiment of the present disclosure, the $C_{3-10}$ cycloalkyl group may be cyclopentyl group, cyclohexyl group, or cycloheptyl group, but may not be limited thereto.

The ruthenium compound according to the present disclosure may be selected from the following compounds, but may not be limited thereto: (p-cymene)[$CH_2$=$C(CH_3)$ $CH$=$C(CH_3)_2$]Ru, (p-cymene)[MeCH=$C(CH_3)CH$=$C$ $(CH_3)_2$]Ru, (p-cymene)[EtCH=$C(CH_3)CH$=$C(CH_3)_2$]Ru, (p-cymene)[$^n$PrCH=C(CH$_3$)CH=C(CH$_3$)$_2$]Ru, (p-cymene)[$^i$PrCH=C(CH$_3$)CH=C(CH$_3$)$_2$]Ru, (p-cymene)[$^n$BuCH=C(CH$_3$)CH=C(CH$_3$)$_2$]Ru, (p-cymene)[$^i$BuCH=C(CH$_3$)CH=C(CH$_3$)$_2$]Ru, (p-cymene)[$^{sec}$BuCH=C(CH$_3$)CH=C(CH$_3$)$_2$]Ru, (p-cymene)[$^t$BuCH=C(CH$_3$)CH=C(CH$_3$)$_2$]Ru, (p-cymene)(CH$_3$CH=CH—CH=CHCH$_3$)Ru, (p-cymene)(Me$_2$C=CH—CH=CHCH$_3$)Ru, (p-cymene)(EtMeC=CH—CH=CHCH$_3$)Ru, (p-cymene)($^n$PrMeC=CH—CH=CHCH$_3$)Ru, (p-cymene)($^i$PrMeC=CH—CH=CHCH$_3$)Ru, (p-cymene)($^n$BuMeC=CH—CH=CHCH$_3$)Ru, (p-cymene)($^i$BuMeC=CH—CH=CHCH$_3$)Ru, (p-cymene)($^{sec}$BuMeC=CH—CH=CHCH$_3$)Ru, (p-cymene)($^t$BuMeC=CH—CH=CHCH$_3$)Ru, (p-cymene)(CH$_2$=CHCH=CHCH$_2$CH$_3$)Ru, (p-cymene)(MeCH=CHCH=CHCH$_2$CH$_3$)Ru, (p-cymene)(EtCH=CHCH=CHCH$_2$CH$_3$)Ru, (p-cymene)($^n$PrCH=CHCH=CHCH$_2$CH$_3$)Ru, (p-cymene)($^i$PrCH=CHCH=CHCH$_2$CH$_3$)Ru, (p-cymene)($^n$BuCH=CHCH=CHCH$_2$CH$_3$)Ru, (p-cymene)($^i$BuCH=CHCH=CHCH$_2$CH$_3$)Ru, (p-cymene)($^{sec}$BuCH=CHCH=CHCH$_2$CH$_3$)Ru, and (p-cymene)($^t$BuCH=CHCH=CHCH$_2$CH$_3$)Ru In an embodiment of the present disclosure, the ruthenium precursor compound may be selected from the following Chemical Formula 1 to Chemical Formula 3:

[Chemical Formula 1]

[Chemical Formula 2]

; and lp;1p

[Chemical Formula 3]

A second aspect of the present disclosure provides a precursor composition for forming a film, including at least one ruthenium precursor compound(s) according to the first aspect.

Detailed descriptions of the second aspect of the present disclosure, which overlap with those of the first aspect of the present disclosure, are omitted hereinafter, but the descriptions of the first aspect of the present disclosure may be identically applied to the second aspect of the present disclosure, even though they are omitted hereinafter.

In an embodiment of the present disclosure, at least one of $R^1$, $R^2$, $R^5$ and $R^6$ may be a substituted or unsubstituted linear or branched $C_{1-10}$ alkyl group; or a substituted or unsubstituted $C_{3-10}$ cycloalkyl group. In an embodiment of the present disclosure, the ruthenium compound may exclude the case where $R^1$, $R^2$, $R^5$ and $R^6$ are hydrogen.

In an embodiment of the present disclosure, the linear or branched $C_{1-10}$ alkyl groups may be selected from methyl group, ethyl group, n-propyl group, iso-propyl group, n-butyl group, iso-butyl group, sec-butyl group, tert-butyl group, n-pentyl group, iso-pentyl group, sec-pentyl group, tert-pentyl group, neo-pentyl group, 3-pentyl group, n-hexyl group, iso-hexyl group, sec-hexyl group, tert-hexyl group, neo-hexyl group, n-heptyl group, iso-heptyl group, sec-heptyl group, tert-heptyl group, neo-heptyl group, n-octyl group, iso-octyl group, sec-octyl group, tert-octyl group, neo-octyl group, n-nonyl group, iso-nonyl group, sec-nonyl group, tert-nonyl group, neo-nonyl group, n-decyl group, iso-decyl group, sec-decyl group, tert-decyl group, neo-decyl group, and group consisting of isomers thereof, but may not be limited thereto. In an embodiment of the present disclosure, the linear or branched $C_{1-10}$ alkyl group may be methyl group, ethyl group, n-propyl group, or iso-propyl group.

In an embodiment of the present disclosure, the $C_{3-10}$ cycloalkyl group may be selected from cyclopropyl group, cyclobutyl group, cyclopentyl group, cyclohexyl group, cycloheptyl group, cyclooctyl group, cyclononyl group, cyclodecyl group, and group consisting of isomers thereof, but may not be limited thereto. In an embodiment of the present disclosure, the $C_{3-10}$ cycloalkyl group may be cyclopentyl group, cyclohexyl group, or cycloheptyl group, but may not be limited thereto.

In an embodiment of the present disclosure, the precursor composition for forming a film may be mixture including at least one of the following ruthenium precursor compounds:

(p-cymene)[CH$_2$=C(CH$_3$)CH=C(CH$_3$)$_2$]Ru, (p-cymene)[(MeCH=C(CH$_3$)CH=C(CH$_3$)$_2$]Ru, (p-cymene)[EtCH=C(CH$_3$)CH=C(CH$_3$)$_2$]Ru, (p-cymene)[$^n$PrCH=C(CH$_3$)CH=C(CH$_3$)$_2$]Ru, (p-cymene)[$^i$PrCH=C(CH$_3$)CH=C(CH$_3$)$_2$]Ru, (p-cymene)[$^n$BuCH=C(CH$_3$)CH=C(CH$_3$)$_2$]Ru, (p-cymene)[$^i$BuCH=C(CH$_3$)CH=C(CH$_3$)$_2$]Ru, (p-cymene)[$^{sec}$BuCH=C(CH$_3$)CH=C(CH$_3$)$_2$]Ru, (p-cymene)[$^t$BuCH=C(CH$_3$)CH=C(CH$_3$)$_2$]Ru, (p-cymene)(CH$_3$CH=CH—CH=CHCH$_3$)Ru, (p-cymene)(Me$_2$C=CH—CH=CHCH$_3$)Ru (p-cymene)(EtMeC=CH—CH=CHCH$_3$)Ru, (p-cymene)($^n$PrMeC=CH—CH=CHCH$_3$)Ru, (p-cymene)($^i$PrMeC=CH—CH=CHCH$_3$)Ru, (p-cymene)($^n$BuMeC=CH—CH=CHCH$_3$)Ru, (p-cymene)($^i$BuMeC=CH—CH=CHCH$_3$)Ru, (p-cymene)($^{sec}$BuMeC=CH—CH=CHCH$_3$)Ru, (p-cymene)($^t$BuMeC=CH—CH=CHCH$_3$)Ru, (p-cymene)(CH$_2$=CHCH=CHCH$_2$CH$_3$)Ru, (p-cymene)(MeCH=CHCH=CHCH$_2$CH$_3$)Ru, (p-cymene)(EtCH=CHCH=CHCH$_2$CH$_3$)Ru, (p-cymene)($^n$PrCH=CHCH=CHCH$_2$CH$_3$)Ru, (p-cymene)($^i$PrCH=CHCH=CHCH$_2$CH$_3$)Ru, (p-cymene)($^n$BuCH=CHCH=CHCH$_2$CH$_3$)Ru, (p-cymene)($^i$BuCH=CHCH=CHCH$_2$CH$_3$)Ru, (p-cymene)($^{sec}$BuCH=CHCH=CHCH$_2$CH$_3$)Ru, and (p-cymene)($^t$BuCH=CHCH=CHCH$_2$CH$_3$)Ru.

In an embodiment of the present disclosure, the ruthenium precursor compound may include at least one selected from the following compounds:

[Chemical Formula 1]

[Chemical Formula 2]

; and

[Chemical Formula 3]

.

In an embodiment of the present disclosure, the film may be at least one selected from a ruthenium metal film, a ruthenium-containing oxide film, a ruthenium-containing nitride film, a ruthenium-containing carbide film and combinations thereof, but may not be limited thereto.

In an embodiment of the present disclosure, the ruthenium-containing oxide film or the ruthenium-containing nitride film may be applied to semiconductors, non-semiconductors and display devices in various ways depending on the purpose of application, but may not be limited thereto.

In an embodiment of the present disclosure, the precursor composition for forming a film may further include at least one nitrogen source(s) selected from ammonia, nitrogen, hydrazine, and dimethyl hydrazine, but may not be limited thereto.

In an embodiment of the present disclosure, the precursor composition for forming a film may further include at least one oxygen source(s) selected from water vapor, oxygen, and ozone, but may not be limited thereto.

A third aspect of the present disclosure provides a method of forming a ruthenium-containing film, including forming a ruthenium-containing film by using a precursor composition for forming a film containing the ruthenium precursor compound according to the first aspect.

Detailed descriptions of the third aspect of the present disclosure, which overlap with those of the first aspect and the second aspect of the present disclosure, are omitted hereinafter, but the descriptions of the first aspect and the second aspect of the present disclosure may be identically applied to the third aspect of the present disclosure, even though they are omitted hereinafter.

In an embodiment of the present disclosure, the ruthenium precursor compound contained in the precursor composition for forming a film may include at least one selected from the following compounds:

[Chemical Formula 1]

[Chemical Formula 2]

; and

[Chemical Formula 3]

.

In an embodiment of the present disclosure, the ruthenium-containing film may be deposited by chemical vapor deposition (CVD) or atomic layer deposition (ALD), but may not be limited thereto.

In an embodiment of the present disclosure, composition of at least one ruthenium precursor compound(s) contained in the precursor composition for forming a film may be maintained while the precursor composition for forming a film is heated for vaporization. In an embodiment of the present disclosure, while the precursor composition for forming a film is heated and vaporized, the composition of at least one ruthenium precursor compound(s) contained in the precursor composition for forming a film may be maintained at about 70% or more, about 80% or more, about 90% or more, or about 95% or more.

In an embodiment of the present disclosure, the ruthenium-containing film may be deposited by metalorganic chemical vapor deposition (MOCVD) or atomic layer deposition (ALD), but may not be limited thereto. In an embodiment of the present disclosure, CVD or ALD is performed using a deposition apparatus, deposition conditions and at least one additional reaction gas(es) known in the art, but may not be limited thereto.

In an embodiment of the present disclosure, a gas, such as a hydrogen ($H_2$) gas, an ammonia ($NH_3$) gas, an oxygen ($O_2$) gas, or an ozone ($O_3$) gas, used in a semiconductor process may be used as a reaction gas for ALD and CVD to form a ruthenium-containing film, but may not be limited thereto. For example, if the $H_2$ gas and/or the $NH_3$ gas are used in ALD and CVD to form a film, a ruthenium-containing film containing less impurities may be formed. For example, if a film is formed using the $O_2$ gas or the $O_3$ gas, a ruthenium oxide film may be formed, but may not be limited thereto.

In an embodiment of the present disclosure, the method of forming a ruthenium-containing film includes: supplying a precursor composition for forming a film containing a ruthenium precursor compound in a gaseous state onto a substrate located in a deposition chamber to form a ruthenium-containing film on the surface of the substrate, but may not be limited thereto.

In an embodiment of the present disclosure, the ruthenium-containing film may be formed in a temperature range of room temperature to about 400° C., but may not be limited thereto. For example, the ruthenium-containing film may be formed in a temperature range of room temperature to about 400° C., room temperature to about 350° C., room temperature to about 300° C., room temperature to about 250° C., room temperature to about 200° C., room temperature to about 150° C., room temperature to about 100° C., about 100° C. to about 400° C., about 100° C. to about 350° C., about 100° C. to about 300° C., about 100° C. to about 250° C., about 100° C. to about 200° C., about 100° C. to about 150° C., about 150° C. to about 400° C., about 150° C. to about 350° C., about 150° C. to about 300° C., about 150° C. to about 250° C., about 150° C. to about 200° C., about 200° C. to about 400° C., about 200° C. to about 350° C., about 200° C. to about 300° C., about 200° C. to about 250° C., about 250° C. to about 400° C., about 250° C. to about 350° C., about 250° C. to about 300° C., about 300° C. to about 400° C., about 300° C. to about 350° C., or about 350° C. to about 400° C., but may not be limited thereto. In an embodiment of the present disclosure, the ruthenium-containing film may be formed in a temperature range of about 200° C. to about 400° C., or about 300° C. to about 400° C.

In an embodiment of the present disclosure, the ruthenium-containing film may be formed in a thickness range of about 1 nm to about 500 nm, but may be applied in various ways depending on the application, and may not be limited thereto. For example, the ruthenium-containing film may be formed in a thickness range of about 1 nm to about 500 nm, about 1 nm to about 400 nm, about 1 nm to about 300 nm, about 1 nm to about 200 nm, about 1 nm to about 100 nm, about 1 nm to about 50 nm, about 1 nm to about 40 nm, about 1 nm to about 30 nm, about 1 nm to about 20 nm, about 1 nm to about 10 nm, about 10 nm to about 500 nm, about 10 nm to about 400 nm, about 10 nm to about 300 nm, about 10 nm to about 200 nm, about 10 nm to about 100 nm, about 10 nm to about 50 nm, about 10 nm to about 40 nm, about 10 nm to about 30 nm, about 10 nm to about 20 nm, about 20 nm to about 500 nm, about 20 nm to about 400 nm, about 20 nm to about 300 nm, about 20 nm to about 200 nm, about 20 nm to about 100 nm, about 20 nm to about 50 nm, about 20 nm to about 40 nm, about 20 nm to about 30 nm, about 30 nm to about 500 nm, about 30 nm to about 400 nm, about 30 nm to about 300 nm, about 30 nm to about 200 nm, about 30 nm to about 100 nm, about 30 nm to about 50 nm, about 30 nm to about 40 nm, about 40 nm to about 500 nm, about 40 nm to about 400 nm, about 40 nm to about 300 nm, about 40 nm to about 200 nm, about 40 nm to about 100 nm, about 40 nm to about 50 nm, about 50 nm to about 500 nm, about 50 nm to about 400 nm, about 50 nm to about 300 nm, about 50 nm to about 200 nm, about 50 nm to about 100 nm, about 100 nm to about 500 nm, about 100 nm to about 400 nm, about 100 nm to about 300 nm, about 100 nm to about 200 nm, about 200 nm to about 500 nm, about 200 nm to about 400 nm, about 200 nm to about 300 nm, about 300 nm to about 500 nm, about 300 nm to about 400 nm, or about 400 nm to about 500 nm, but may not be limited thereto. In an embodiment of the present disclosure, the ruthenium-containing film may be formed in a thickness range of about 1 nm to about 50 nm.

In an embodiment of the present disclosure, the ruthenium-containing film may be formed on at least one substrate(s) selected from conventional silicon semiconductor wafers, compound semiconductor wafers, and plastic substrates (PI, PET, PES, and PEN), but may not be limited thereto. Also, a substrate having holes or grooves(trenches) may be used, and a porous substrate having a large surface area may also be used, but may not be limited thereto. Further, the ruthenium-containing film may be formed simultaneously or sequentially on all or a part of a substrate in which two or more different types of substrates are contacted or connected with each other, but may not be limited thereto.

In an embodiment of the present disclosure, the ruthenium-containing film may be formed on a substrate including trenches (grooves) with an aspect ratio of about 1 to about 100 and a width of about 10 nm to about 1 μm, but may not be limited thereto. The trenches (grooves) may be in the form of a hole. For example, the aspect ratio may be about 1 or more, about 10 or more, about 30 or more, about 50 or more, about 1 to about 100, about 1 to about 90, about 1 to about 80, about 1 to about 70, about 1 to about 60, about 1 to about 50, about 1 to about 40, about 1 to about 30, about 1 to about 20, about 1 to about 10, about 10 to about 100, about 10 to about 90, about 10 to about 80, about 10 to about 70, about 10 to about 60, about 10 to about 50, about 10 to about 40, about 10 to about 30, about 10 to about 20, about 20 to about 100, about 20 to about 90, about 20 to about 80, about 20 to about 70, about 20 to about 60, about 20 to about 50, about 20 to about 40, about 20 to about 30, about 30 to about 100, about 30 to about 90, about 30 to about 80, about 30 to about 70, about 30 to about 60, about 30 to about 50, about 30 to about 40, about 40 to about 100, about 40 to about 90, about 40 to about 80, about 40 to about 70, about 40 to about 60, about 40 to about 50, about 50 to about 100, about 50 to about 90, about 50 to about 80, about 50 to about 70, about 50 to about 60, about 60 to about 100, about 60 to about 90, about 60 to about 80, about 60 to about 70, about 70 to about 100, about 70 to about 90, about 70 to about 80, about 80 to about 100, about 80 to about 90, or about 90 to about 100, but may not be limited thereto. Also, for example, the width may be about 10 nm to about 1 μm, about 10 nm to about 900 nm, about 10 nm to about 800 nm, about 10 nm to about 700 nm, about 10 nm to about 600 nm, about 10 nm to about 500 nm, about 10 nm to about 400 nm, about 10 nm to about 300 nm, about 10 nm to about 200 nm, about 10 nm to about 100 nm, about 10 nm to about 90 nm, about 10 nm to about 80 nm, about 10 nm to about 70 nm, about 10 nm to about 60 nm, about 10 to about 50 nm, about 10 nm to about 40 nm, about 10 nm to about 30 nm, about 10 nm to about 20 nm, about 20 nm to about 1 μm, about 20 nm to about 900 nm, about 20 nm to about 800 nm, about 20 nm to about 700 nm, about 20 nm to about 600 nm, about 20 nm to about 500 nm, about 20 nm to about 400 nm, about 20 nm to about 300 nm, about 20 nm to about 200 nm, about 20 nm to about 100 nm, about 20 nm to about 90 nm, about 20 nm to about 80 nm, about 20 nm to about 70 nm, about 20 nm to about 60 nm, about 20 nm to about 50 nm, about 20 nm to about 40 nm, about 20 nm to about 30 nm, about 30 nm to about 1 μm, about 30 nm to about 900 nm, about 30 nm to about 800 nm, about 30 nm to about 700 nm, about 30 nm to about 600 nm, about 30 nm to about 500 nm, about 30 nm to about 400 nm, about 30 nm to about 300 nm, about 30 nm to about 200 nm, about 30 nm to about 100 nm, about 30 nm to about 90 nm, about 30 nm to about 80 nm, about 30 nm to about 70 nm, about 30 nm to about 60 nm, about 30 to about 50 nm, about 30 nm to about 40 nm, about 40 nm to about 1 nm, about 40 nm to about 900 nm, about 40 nm to about 800 nm, about 40 nm to about 700 nm, about 40 nm to about 600 nm, about 40 nm to about 500 nm, about 40 nm to about 400 nm, about 40 nm to about 300 nm, about 40 nm to about 200 nm, about 40 nm to about 100 nm, about 40 nm to about 90 nm, about 40 nm to about 80 nm, about 40 nm to about 70 nm, about 40 nm to about 60 nm, about 40 to about 50 nm, about 50 nm to about 1 µm, about 50 nm to about 900 nm, about 50 nm to about 800 nm, about 50 nm to about 700 nm, about 50 nm to about 600 nm, about 50 nm to about 500 nm, about 50 nm to about 400 nm, about 50 nm to about 300 nm, about 50 nm to about 200 nm, about 50 nm to about 100 nm, about 50 nm to about 90 nm, about 50 nm to about 80 nm, about 50 nm to about 70 nm, about 50 nm to about 60 nm, about 100 nm to about 1 nm, about 100 nm to about 900 nm, about 100 nm to about 800 nm, about 100 nm to about 700 nm, about 100 nm to about 600 nm, about 100 nm to about 500 nm, about 100 nm to about 400 nm, about 100 nm to about 300 nm, about 100 nm to about 200 nm, about 200 nm to about 1 µm, about 200 nm to about 900 nm, about 200 nm to about 800 nm, about 200 nm to about 700 nm, about 200 nm to about 600 nm, about 200 nm to about 500 nm, about 200 nm to about 400 nm, about 200 nm to about 300 nm, about 300 nm to about 1 µm, about 300 nm to about 900 nm, about 300 nm to about 800 nm, about 300 nm to about 700 nm, about 300 nm to about 600 nm, about 300 nm to about 500 nm, about 300 nm to about 400 nm, about 400 nm to about 1 µm, about 400 nm to about 900 nm, about 400 nm to about 800 nm, about 400 nm to about 700 nm, about 400 nm to about 600 nm, about 400 nm to about 500 nm, about 500 nm to about 1 µm, about 500 nm to about 900 nm, about 500 nm to about 800 nm, about 500 nm to about 700 nm, about 500 nm to about 600 nm, about 600 nm to about 1 nm, about 600 nm to about 900 nm, about 600 nm to about 800 nm, about 600 nm to about 700 nm, about 700 nm to about 1 µm, about 700 nm to about 900 nm, about 700 nm to about 800 nm, about 800 nm to about 1 nm, about 800 nm to about 900 nm, or about 900 nm to about 1 µm, but may not be limited thereto.

In an embodiment of the present disclosure, the ruthenium precursor compound of the present disclosure contained in the precursor composition for forming a film has low density and high thermal stability and thus can be used as a precursor of ALD or CVD to form a ruthenium-containing film, In particular, a ruthenium-containing film having a thickness of several nm to several µm may be uniformly formed on a substrate with a pattern(groove or trench) on the surface, a porous substrate, or a plastic substrate in a temperature range of room temperature to about 400° C., about 200° C. to about 400° C., or about 300° C. to about 400° C.

In an embodiment of the present disclosure, in the method of forming a ruthenium-containing film, desirably, after the substrate is contained in a reaction chamber, the ruthenium precursor compound may be delivered onto the substrate with a carrier gas or a diluent gas and a ruthenium-containing oxide thin film or nitride thin film may be deposited over a wide range of deposition temperature of room temperature to about 400° C., or about 200° C. to about 400° C. However, the present disclosure may not be limited thereto.

In an embodiment of the present disclosure, at least one mixed gas(es) selected from argon (Ar), nitrogen ($N_2$), helium (He) or hydrogen ($H_2$) may be desirably used as the carrier gas or diluent gas, but the present disclosure may not be limited thereto.

In an embodiment of the present disclosure, the ruthenium precursor compound may be delivered onto the substrate by various methods, including a bubbling method using a carrier gas to forcibly vaporize the precursor, a liquid delivery system (LDS) method of supplying the precursor in a liquid state at room temperature and vaporizing the precursor through a vaporizer, and a vapor flow controller (VFC) method of directly supplying the precursor using a vapor pressure of the precursor. When the vapor pressure is high, the VFC method may be used, and when the vapor pressure is low, a bypass method of heating the container to vaporize the precursor may be used. The ruthenium precursor compound may be put into the bubbler container or VFC container and supplied into the chamber by means of bubbling with the carrier gas in a pressure range of about 0.1 torr to about 10 torr and a temperature range of room temperature to about 100° C. or by means of a method using a high vapor pressure. Most desirably, the LDS method of supplying the ruthenium precursor compound in a liquid state at room temperature and vaporizing the precursor through a vaporizer may be used, but the present disclosure may not be limited thereto.

In an embodiment of the present disclosure, it is more desirable to use argon (Ar) or nitrogen ($N_2$) for delivery, use heat energy or plasma, or apply a bias onto the substrate in order to vaporize the ruthenium precursor compound, but the present disclosure may not be limited thereto.

In an embodiment of the present disclosure, since the deposition temperature is in the range of room temperature to about 400° C. or about 200° C. to about 400° C., the process temperature that can be applied to memory devices, logic devices and display devices has a wide range, which results in great application potential in various fields. Also, since the ruthenium-containing oxide thin film or nitride thin film has different film properties, a ruthenium precursor compound that can be used in a wide temperature range is needed. Therefore, deposition may be performed desirably in the deposition temperature range of room temperature to about 400° C. or about 200° C. to about 400° C., but the present disclosure may not be limited thereto.

In an embodiment of the present disclosure, when the ruthenium-containing oxide film is formed while the ruthenium-containing film is deposited, one or a mixture of two or more selected from water vapor ($H_2O$), oxygen ($O_2$), oxygen plasma ($O_2$ plasma), nitrogen oxides (NO, $N_2O$), nitrogen oxide plasma ($N_2O$ plasma), oxygen nitride ($N_2O_2$), hydrogen peroxide ($H_2O_2$) and ozone ($O_3$) may be desirably used as the reaction gas. However, the present disclosure may not be limited thereto.

In an embodiment of the present disclosure, when the ruthenium-containing film is deposited, it is desirable to use ammonia ($NH_3$), ammonia plasma ($HN_3$ plasma), hydrazine ($N_2H_4$) or nitrogen plasma ($N_2$ plasma) as the reaction gas to deposit the ruthenium-containing nitride film. However, the present disclosure may not be limited thereto.

MODE FOR CARRYING OUT THE INVENTION

Hereinafter, the present disclosure will be explained in more detail with reference to Examples. However, the following Examples are illustrative only for better understanding of the present disclosure but do not limit the present disclosure.

EXAMPLE

<Example 1> Preparation of (p-cymene)(2,4-Dimethyl-1,3-pentadiene)Ru: [CH₃C₆H₄CH(CH₃)₂][CH₂=C(CH₃)CH=C(CH₃)₂]Ru

[Chemical Formula 1]

In a flame-dried 1000 ml Schlenk flask, 88.5 g of [RuCl₂(p-cymene)]2 (0.144 mol) and 91.8 g of Na₂CO₃ (0.867 mol) were mixed with 400 ml of 2-propanol to prepare a suspension. Then, 25 g of 2,4-dimethyl-1,3-pentadiene (0.260 mol) was slowly added into the suspension, and then refluxed for 12 hours to complete the reaction. After the reaction was completed, the solvent and volatile by-product were removed under a reduced pressure and then extraction was carried out with 500 mL of n-hexane. After the n-hexane extract was filtered through a celite pad and a glass frit, the obtained filtrate was subject to a reduced pressure to remove the solvent and distilled under a reduced pressure. As a result, 52.2 g (yield of 50.1%) of orange liquid compound [(p-cymene)(2,4-dimethyl-1,3-pentadiene)Ru] represented by Chemical Formula 2 was obtained.

The boiling point: 92° C. at 0.3 torr density: 1.25 g/mL (at 25° C.)

¹H-NMR (400 MHz, C₆D₆, 25° C.): δ 4.981 (d, 1H, [CH₃C₆H₄CH(CH₃)₂]—Ru), δ 4.656 (d, 1H, [CH₃C₆H₄CH(CH₃)₂]—Ru), δ 4.596 (d, 1H, [CH₃C₆H₄CH(CH₃)₂]—Ru), δ 4.384 (s, 1H, [CH₂=C(CH₃)CH=C(CH₃)₂]—Ru), δ 4.359 (d, 1H, [CH₃C₆H₄CH(CH₃)₂]—Ru), δ 2.431 (q, 1H, [CH₃C₆H₄CH(CH₃)₂]—Ru), δ 1.933 (s, 3H, [CH₃C₆H₄CH(CH₃)₂]—Ru), δ 1.878 (s, 1H, [CH₂=C(CH₃)CH=C(CH₃)₂]—Ru), δ 1.824 (s, 3H, [CH₂=C(CH₃)CH=C(CH₃)₂]—Ru), δ 1.533 (s, 1H, [CH₂=C(CH₃)CH=C(CH₃)₂]—Ru), δ 1.479 (s, 3H, [CH₂=C(CH₃)CH=C(CH₃)₂]—Ru), δ 1.264 (s, 3H, [CH₂=C(CH₃)CH=C(CH₃)₂]—Ru), δ 1.186 (m, 6H, [CH₃C₆H₄CH(CH₃)₂]—Ru)

<Example 2> Preparation of Mixed Composition of (p-cymene)(2,4-hexadiene)Ru and (p-cymene)(1,3-hexadiene) Ru: [CH₃C₆H₄CH(CH₃)₂](CH₃CH=CH—CH=CHCH₃)Ru+[CH₃C₆H₄CH(CH₃)₂](CH₂=CHCH=CHCH₂CH₃)Ru

[Chemical Formula 2]

[Chemical Formula 3]

In a flame-dried 1000 mL Schlenk flask, 30 g of [RuCl₂(p-cymene)]₂ (0.048 mol) and 30.5 g of Na₂CO₃ (0.288 mol) were mixed with 400 ml of 2-propanol to prepare a suspension. Then, 16.6 g of 2,4-hexadiene (0.192 mol) was slowly added into the suspension and then refluxed for 40 hours to complete the reaction. After the reaction was completed, the solvent and volatile by-product were removed under a reduced pressure and then extraction was carried out with 500 mL of n-hexane. After the n-hexane extract was filtered through a celite pad and a glass frit, the obtained filtrate was subject to a reduced pressure to remove the solvent and distilled under a reduced pressure. As a result, 22 g (yield of 62.8%) of orange liquid compound [composition of (p-cymene)(2,4-hexadiene)Ru and (p-cymene)(1,3-hexadiene)Ru] represented by Chemical Formula 3 was obtained.

It can be seen from the NMR spectrum of the above liquid that the liquid is a mixture of (p-cymene)(2,4-hexadiene)Ru and (p-cymene)(1,3-hexadiene)Ru mixed at a ratio of 6:4.

There has been known an isomerization reaction in which hydrogen bonded to double-bonded carbon coordinated with a ruthenium-based metal moves to another carbon [Y. M. Wuu et al, Inorganic Chemistry 1988, 27(17), 3039-3044, doi: 10.1021/ic00290a028]. It is presumed that a part of 2,4-hexadiene used as a raw material was transformed into 1,3-hexadiene by the isomerization reaction. The boiling points of the two isomers are almost the same. Therefore, the ratio of 6:4 was maintained even after distillation under a reduced pressure.

The boiling point: 86° C. at 0.3 torr density: 1.32 g/mL (at 25° C.)

¹H-NMR (700 MHz, C₆D₆, 25° C.):

Isomer 1. Chemical Formula 2: (p-cymene)(2,4-hexadiene)Ru, [CH₃C₆H₄CH(CH₃)₂](CH₃CH=CH—CH=CHCH₃)Ru δ 4.668 (m, 4H, [CH₃C₆H₄CH(CH₃)₂](CH₃CH=CH—CH=CHCH₃)Ru), δ 4.330 (m, 2H, [CH₃C₆H₄CH(CH₃)₂](CH₃CH=CH—CH=CHCH₃)Ru), δ 2.338 (m, 1H, [CH₃C₆H₄CH(CH₃)₂](CH₃CH=CH—CH=CHCH₃)Ru), δ 2.013 (s, 3H, [CH₃C₆H₄CH(CH₃)₂](CH₃CH=CH—CH=CHCH₃)Ru), δ 1.371 (d, 6H, [CH₃C₆H₄CH(CH₃)₂](CH₃CH=CH—CH=CHCH₃)Ru), δ 1.147 (d, 6H, [CH₃C₆H₄CH(CH₃)₂](CH₃CH=CH—CH=CHCH₃)Ru), δ 0.739 (m, 2H, [CH₃C₆H₄CH(CH₃)₂](CH₃CH=CH—CH=CHCH₃)Ru)

Isomer 2. Chemical Formula 3: (p-cymene)(1,3-hexadiene)Ru, [CH₃C₆H₄CH(CH₃)₂](CH₂=CHCH=CHCH₂CH₃)Ru δ 4.983 (m, 1H, [CH₃C₆H₄CH(CH₃)₂](CH₂=CHCH=CHCH₂CH₃)Ru), δ 4.835 (m, 2H,

[CH$_3$C$_6$H$_4$CH(CH$_3$)$_2$](CH$_2$=CHCH=CHCH$_2$CH$_3$)Ru), δ 4.727 (m, 1H, [CH$_3$C$_6$H$_4$CH(CH$_3$)$_2$](CH$_2$=CHCH=CHCH$_2$CH$_3$)Ru), δ 4.603 (m, 1H, [CH$_3$C$_6$H$_4$CH(CH$_3$)$_2$](CH$_2$=CHCH=CHCH$_2$CH$_3$)Ru), δ 4.418 (m, 1H, [CH$_3$C$_6$H$_4$CH(CH$_3$)$_2$](CH$_2$=CHCH=CHCH$_2$CH$_3$)Ru), δ 2.302 (m, 1H, [CH$_3$C$_6$H$_4$CH(CH$_3$)$_2$](CH$_2$=CHCH=CHCH$_2$CH$_3$)Ru), δ 1.969 (s, 3H, [CH$_3$C$_6$H$_4$CH(CH$_3$)$_2$](CH$_2$=CHCH=CHCH$_2$CH$_3$)Ru), δ 1.758 (d, 1H, [CH$_3$C$_6$H$_4$CH(CH$_3$)$_2$](CH$_2$=CHCH=CHCH$_2$CH$_3$)Ru), δ 1.703 (m, 1H, [CH$_3$C$_6$H$_4$CH(CH$_3$)$_2$](CH$_2$=CHCH=CHCH$_2$CH$_3$)Ru), δ 1.401 (m, 1H, [CH$_3$C$_6$H$_4$CH(CH$_3$)$_2$](CH$_2$=CHCH=CHCH$_2$CH$_3$)Ru), δ 1.120 (t, 3H, [CH$_3$C$_6$H$_4$CH(CH$_3$)$_2$](CH$_2$=CHCH=CHCH$_2$CH$_3$)Ru), δ 1.098 (m, 6H, [CH$_3$C$_6$H$_4$CH(CH$_3$)$_2$](CH$_2$=CHCH=CHCH$_2$CH$_3$)Ru), δ 0.726 (m, 1H, [CH$_3$C$_6$H$_4$CH(CH$_3$)$_2$](CH$_2$=CHCH=CHCH$_2$CH$_3$)Ru), δ 0.194 (d, 1H, [CH$_3$C$_6$H$_4$CH(CH$_3$)$_2$](CH$_2$=CHCH=CHCH$_2$CH$_3$)Ru).

<Test Example 1> Evaluation of Thermal Stability of Ruthenium Precursor Composition of Example 1

2 g of the composition containing the ruthenium precursor compound (Chemical Formula 1) synthesized in Example 1 was put into each of four sealed stainless steel containers, and then each of the containers was heated at 110° C. and 120° C. for 7 days, 14 days and 28 days.

The NMR was measured before and after heating, and the respective purities were as shown in following Table 1. Even after 28 days of heating, there was little change in purity and no new NMR peaks appeared. Therefore, it can be confirmed that the ruthenium precursor composition[(p-cymene)(2,4-dimethyl-1,3-pentadiene)Ru] of Example 1 maintained a constant ratio without decomposition while being heated at 110° C. and 120° C. for vaporization.

TABLE 1

Evaluation of thermal stability of ruthenium precursor composition of Example 1

| Heating condition | Purity of (p-cymene) (2,4-dimethyl-1,3-pentadiene)Ru | New NMR peak |
| --- | --- | --- |
| Before heating | 99.80% | — |
| 110° C., 7 days | 99.79% | None |
| 110° C., 14 days | 99.75% | None |
| 110° C., 28 days | 99.71% | None |
| 120° C., 7 days | 99.78% | None |
| 120° C., 14 days | 99.82% | None |
| 120° C., 28 days | 99.72% | None |

<Test Example 2> Evaluation of Thermal Stability of Ruthenium Precursor Composition of Example 2

2 g of the ruthenium precursor composition[mixture of (p-cymene)(2,4-hexadiene)Ru (Chemical Formula 2) (p-cymene)(1,3-hexadiene) Ru (Chemical Formula 3)] synthesized in Example 2 was put into each of four sealed stainless steel containers, and then each of the containers was heated at 110° C. and 120° C. for 7 days, 14 days and 28 days.

The ratios of the isomers whose NMR was measured before and after heating were as shown in the following Table 2. Even after 14 days of heating, there was little change in the ratios of the isomers and no new NMR peaks appeared. Therefore, it can be confirmed that the ratios of the isomers were maintained constant while the ruthenium precursor composition of Example 2 was heated at 110° C. and 120° C. for vaporization.

TABLE 2

Evaluation of thermal stability of ruthenium precursor composition of Example 2

| | Ratios of the isomers | | |
| --- | --- | --- | --- |
| Heating condition | (p-cymene)(2,4-hexadiene)Ru | (p-cymene)(1,3-hexadiene)Ru | New NMR peak |
| Before heating | 58.9% | 41.4% | — |
| 110° C., 7 days | 59.6% | 40.4% | None |
| 110° C., 14 days | 60.1% | 39.9% | None |
| 120° C., 7 days | 60.3% | 39.7% | None |
| 120° C., 14 days | 60.3% | 39.7% | None |

As for the ruthenium precursor composition having low thermal stability, the compositional ratios of the isomers were changed during vaporization, whereas as for the ruthenium precursor composition of the present disclosure, the compositional ratios were maintained constant during heating and vaporization.

<Test Example 3> Deposition of Ruthenium Film Using (p-cymene)(2,4-dimethyl-1,3-pentadiene)Ru By using a precursor composition consisting of the compound (p-cymene)(2,4-dimethyl-1,3-pentadiene)Ru prepared by the method of Example 1, a ruthenium metal film was formed by plasma enhanced atomic layer deposition (PEALD). The ruthenium precursor composition was put into a stainless steel container, heated at a temperature of 100° C. and vaporized by allowing an Ar carrier gas to flow at a flow rate of 200 sccm so as to be supplied to the PEALD reactor. At that time, a process pressure of the PEALD reactor was maintained at 1 torr to 1.2 torr. The PEALD process was performed by using a piece of a silicon wafer heated at 300° C. as a substrate. Whenever a mixed gas of oxygen and nitrogen was supplied, (O2+N$_2$) plasma generated by applying RF power of 200 W as a pulse was used as a reaction gas. The ALD gas supply cycle consisting of supply of the ruthenium precursor composition for 10 seconds, Ar gas purge for 10 seconds, supply of (O$_2$+N$_2$) plasma reaction gas for 10 seconds and Ar gas purge for 10 seconds was repeated 200 times.

Figure 2:
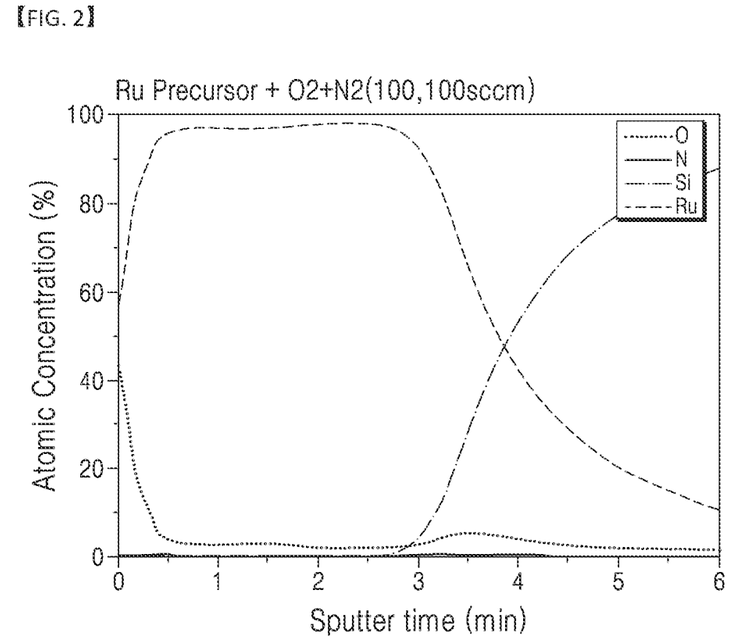
FIG. 2 shows the composition of a film depending on a ruthenium film thickness measured by Auger electron spectroscopy.

The mixing ratios of oxygen (O$_2$) and nitrogen (N$_2$) used as reaction gases were adjusted to 70 sccm:140 sccm, 100 sccm:100 sccm and 200 sccm:0 sccm, and the sheet resistance of the ruthenium film formed in each case was measured. The film thickness was measured with a transmission electron microscope (TEM), and the calculated resistivity was as shown in the following Table 3. Also, the film compositions at different thicknesses measured by Auger electron spectroscopy were as shown in FIG. 2.

TABLE 3

Figure 1A:
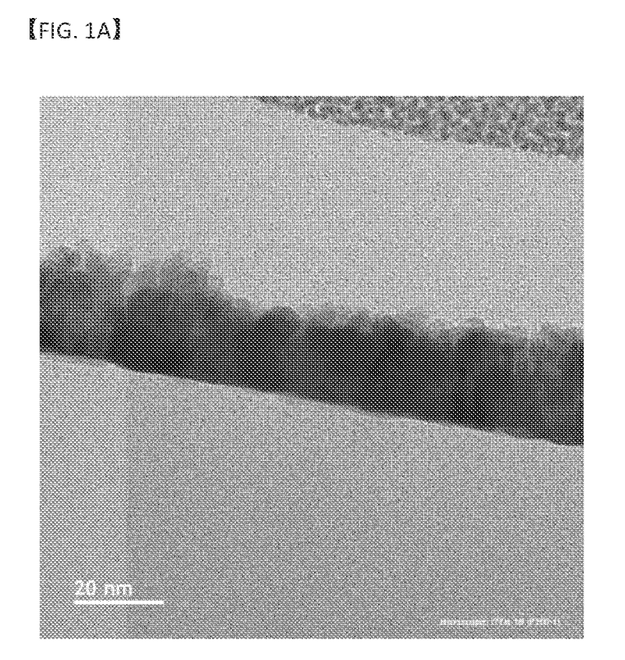
FIG. 1A to FIG. 1C are transmission electron microscopy (TEM) images of ruthenium-containing films formed using oxygen ($O_2$) and nitrogen ($N_2$) gases as reaction gases at various mixing ratios of 70 sccm:140 sccm, 100 sccm:100 sccm, and 200 sccm:0 sccm, respectively.
Figure 1B:
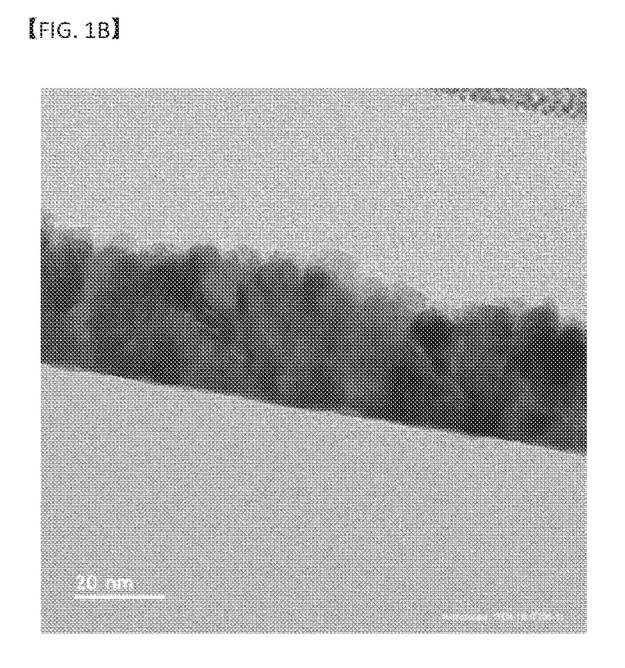
Figure 1C:
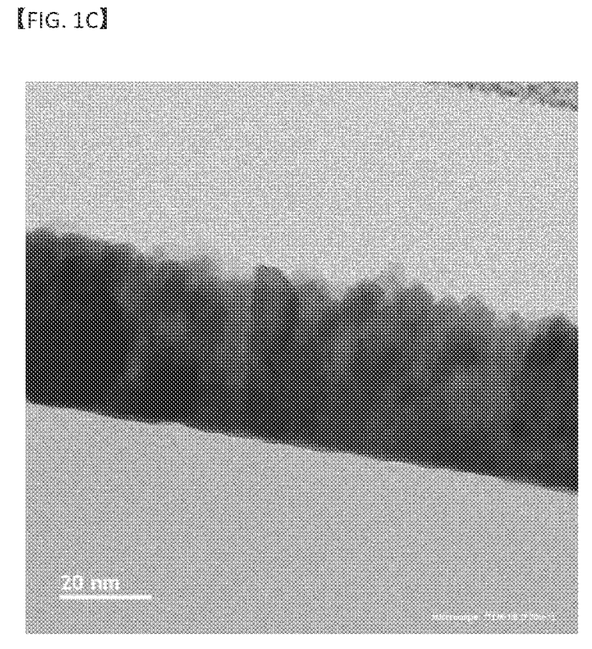

| Reaction gas | Temperature (° C.) | TEM image | Thickness measured by TEM (Å) | Grow per cycle (Å/cycle) | Sheet resistivity (μΩ/sq) | Resistivity (μΩ · cm) |
|---|---|---|---|---|---|---|
| $O_2 + N_2$ (70:140 sccm) | 300 | FIG. 1A | 192 | 0.96 | $1.06 \times 10^7$ | 20.4 |
| $O_2 + N_2$ (100:100 sccm) | 300 | FIG. 1B | 309 | 1.55 | $0.98 \times 10^7$ | 30.2 |
| $O_2 + N_2$ (200:0 sccm) | 300 | FIG. 1C | 369 | 1.85 | $0.74 \times 10^7$ | 27.3 |
| Bulk ruthenium metal resistivity reference | | | | | | 7.1 |

It can be seen from the above test results that a ruthenium metal film having good electrical conductivity with a film thickness of about 150 Å to about 400 Å and a resistivity of about 20 g-cm to about 30 μΩ·cm was formed.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A ruthenium precursor compound represented by the following Chemical Formula 1:

[Chemical Formula 1]

2. A precursor composition for forming a film, comprising the ruthenium precursor of claim 1 and at least one nitrogen source(s) selected from ammonia, nitrogen, hydrazine, or dimethyl hydrazine.

3. A precursor composition for forming a film, comprising the ruthenium precursor of claim 1 and at least one oxygen source(s) selected from water vapor, oxygen, or ozone.

4. A method of forming a ruthenium-containing film, comprising forming a ruthenium-containing film using a precursor composition for forming a film containing a ruthenium precursor compound represented by the following Chemical Formula 1:

[Chemical Formula 1]

5. The method of claim 4,
wherein the ruthenium-containing film is deposited by chemical vapor deposition or atomic layer deposition.

6. The method of claim 5,
wherein composition of at least one ruthenium precursor compound(s) contained in the precursor composition for forming a film is maintained while the precursor composition for forming a film is heated for vaporization.

7. The method of claim 4,
wherein the ruthenium-containing film is formed in a temperature range of room temperature to 400° C.

8. The method of claim 4,
wherein the ruthenium-containing film is formed in a thickness range of 1 nm to 500 nm.

9. The method of claim 4,
wherein the ruthenium-containing film is formed on a substrate including trenches (grooves) with an aspect ratio of 1 to 100 and a width of 10 nm to 1 μm.

* * * * *